March 17, 1970   F. H. VAN WINSEN ET AL   3,501,184
ELASTIC COUPLING METHOD AND APPARATUS
Filed Dec. 14, 1966
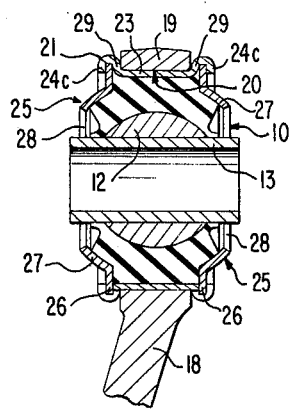
FIG.1
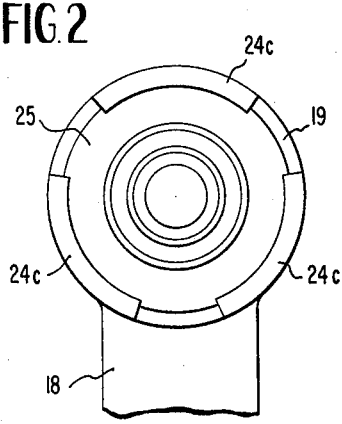
FIG.2
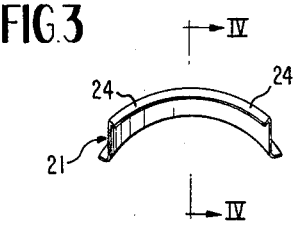
FIG.3
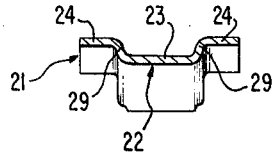
FIG.4
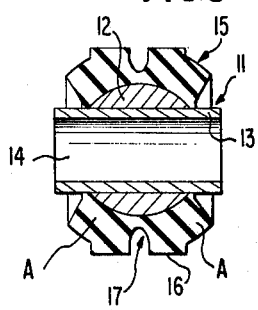
FIG.5
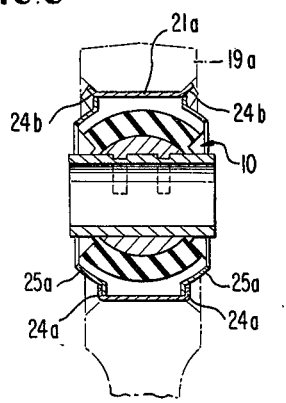
FIG.6
FIG.7
INVENTORS
FRIEDRICH H. VAN WINSEN
HANS - KARL DAUR
BY Dicke + Craig
ATTORNEYS

United States Patent Office 3,501,184
Patented Mar. 17, 1970

3,501,184
ELASTIC COUPLING METHOD AND APPARATUS
Friedrich H. van Winsen, Kirchheim unter Teck, and Hans-Karl Daur, Stuttgart-Bad Cannstatt, Germany, assignors to Daimler-Benz Aktiengesellschaft, Stuttgart-Unterturkheim, Germany
Filed Dec. 14, 1966, Ser. No. 601,624
Claims priority, application Germany, Dec. 14, 1965,
D 48,905
Int. Cl. F16c *11/06;* F16b *7/00;* B25g *3/38*
U.S. Cl. 287—88                                    9 Claims

ABSTRACT OF THE DISCLOSURE

The present disclosure relates to an elastic coupling wherein the elastic coupling includes an annular rigid outer member, a rigid inner member, an annular elastic intermediate member and side members. The inner, outer and intermediate members are constructed and assembled so that there is substantially no stressing of the intermediate elastic member. Thereafter, the side members are axially forced together to axially compress the elastic member and expand the elastic member into engagement with both the inner and outer members. At least one of the members is radially deformed to hold the side members in their axially displaced positions to produce a final assembly.

Background of the invention

It is known in the prior art to provide a substantially rigid outer member, a substantially rigid inner member and a radially stressed elastic member therebetween held in a stressed position by side members. However, such couplings have been relatively expensive and complicated in their manufacture as well as in their assembly. It is an object of the present invention to overcome the disadvantages by providing a coupling that is simpler in its construction and more readily mass produced in a more economical manner.

Brief description of the invention

The above-mentioned coupling of the present disclosure can employ an outer housing or member that includes a sheet metal stamping that is easily manufactured and readily deformable both radially outwardly to engage the outer ring and radially inwardly to engage and hold the side members in their position to stress the intermediate elastic member. These radial deformations may be readily accomplished in a simple, economical and rapid manner during mass production. Also, the sheet metal portion of the outer member may be quickly brought into form-locking engagement preventing relative axial displacement with the ring-shaped member to be coupled by providing this metal stamping with preformed radially outwardly extending deformations that form a U-shape annular channel for engaging the ring; this sheet metal stamping may be basically annular and split into a plurality of arcuate sections for easy assembly with the ring.

Preferably, the outer member has a cylindrical inner bore and the intermediate elastic member has a correspondingly shaped cylindrical outer bearing surface. Also, it is a specifically advantageous feature of the present invention that the inner member has a spherical outer bearing surface engaging a correspondingly spherical inner bearing surface of the intermediate elastic member so that the two may be assembled together. Thereafter, the assembled inner and intermediate members may be quickly and freely brought into an assembled relationship with the outer member because of the cylindrical bore of the outer member and the corresponding cylindrical outer bearing surface of the intermediate member without stressing of the elastic intermediate member. A preferred construction is such that the final assembly is accomplished by pressing the side members radially inwardly toward each other so that the elastic member is radially expanded into engagement with both the inner and outer members, and the sheet metal stamping portion of the outer member is radially deformed inwardly to hold the side members in their inwardly displaced positions.

Also, the sheet metal stamping portion of the outer member may be in a continuous ring and the radial deformation preventing relative movement between the sheet metal stamping portion and ring portion of the outer member and the radial deformation of the sheet metal portion of the outer member to engage the side members may be formed in a single production step, that is, simultaneously.

Further objects, features, and advantages of the present invention will become more apparent from the following detailed description of the drawing.

Brief description of the drawing

FIGURE 1 shows an axial cross-sectional view through an elastic coupling of the present invention, particularly a torsion rod in the motor vehicle;

FIGURE 2 is a side view of the elastic coupling according to FIGURE 1;

FIGURE 3 is a view of one arcuate section of the stamping portion of the outer member, according to one embodiment of the present invention;

FIGURE 4 is a cross-sectional view taken along line IV—IV of FIGURE 3;

FIGURE 5 illustrates the intermediate member and the inner member of the present invention prior to its assembly with the outer member;

FIGURE 6 illustrates another embodiment of the present invention in a cross-sectional view similar to FIGURE 1, but showing the sheet metal portion of the outer member constructed as a single annular stamping; and FIGURE 7 is a side view of the elastic coupling according to FIGURE 6.

The elastic rubber-metal coupling 10 in FIGURE 1 may be the torsion rod coupling in an automotive vehicle; however, the coupling may be used in other environments according to the broad aspects of the present invention. Referring more specifically to FIGURE 5, the coupling includes a metallic inner member 11 provided with a spherical body 12 rigidly mounted on a tube like leg 13 that has an axial bore 14. A torsion member, for example, may be rigidly attached to the tube 13 through the bore 14. An annular elastic intermediate member 15 may be mounted on the inner member 11, preferably rigidly. Intermediate member 15 may be constructed of rubber, for example. The intermediate member 15 is provided with a spherical inner bearing surface in engagement with the bearing body 12 and is provided with an outer cylindrical bearing surface 16, which has a slot-like annular groove 17 cut in the radial direction. The annular groove 17 divides the intermediate member into two sections, A. The inner member 11 and the intermediate member 15 are symmetrical and concentric.

As shown in FIGURE 1, a torsion rod 18 is provided with a relatively rigid ring or eye joint 19, which is provided with a cylindrical bore 20. According to one embodiment, a plurality of arcuate sheet metal sections 21 may be inserted into the bore 20. The ring 19 and arcuate sections 21 constitute the outer member of the elastic coupling.

The three arcuate sections 21 are substantially of identical construction, one being shown in FIGURES 3 and 4. Before assembly, each of the arcuate sections 21 has a substantially U-shaped outwardl yopening arcuate channel deformation 22 for engaging the ring 19 to prevent relative axial movement. During assembly, the three arcuate sections 21 are inserted into the bore 20 so that the U-shaped deformations 22 engage the ring 19 to prevent relative axial movement. With the thus assembled outer member, the inner surfaces of the arcuate section walls 22 form a continuous uniform inner cylindrical bearing surface and bore into which the elements of FIGURE 5 may be inserted without stressing or deformation of the intermediate elastic member 15.

In FIGURES 3 and 4, the arcuate sections 21 are shown before they are assembled. In this condition, they have cylindrical outer walls or flanges 24 that are substantially parallel to the walls 23.

A plurality of sheet metal stamping side members, for example, two, are provided on each side of the intermediate member 15, preferably one annular side member on each side of the intermediate member 15. Preferably, the side members 25 are provided with a radial disk-like edge portion 26, an annular spherical portion 27 complementary in shape to the spherical body 12, and a bore 28 concentric with the other members.

During assembly, the inner, intermediate and outer members are assembled as mentioned above with the arcuate sections 21 in the form shown in FIGURES 3 and 4. Thereafter, the sheet metal stamping side members 25 are concentrically disposed in opposite sides of the intermediate member 15 in close engagement with the walls 24 of the arcuate sections 21 and in engagement with the intermediate elastic member 15. By using an assembly instrument, or by hand, the side members 25 may be pressed axially toward each other to axially compress and radially expand the intermediate member until the side members abut against the transition ledges 29 of the arcuate sections 21. In this position, the intermediate member 15 is expanded resiliently outwardly into tight engagement with the walls 23 of the arcuate sections 21 and elastically inwardly into engagement with the spherical body 12. It is contemplated that the spherical body 12 may be elastic so that it may be elastically compressed into engagement with the tube 13 or the spherical body 12 may be relatively inelastic. In this stressed condition, the sections A may be pushed axially together to close the annular slot 17, which was provided to obtain additional resiliency of the intermediate member 13. Simultaneously, the walls 24 may be deformed inwardly to produce radially inwardly extending flanges 24c, FIGURE 1, that axially engage opposite sides of the side members 25 to hold the side members 25 in their inwardly displaced positions and the elastic member 15 in its stressed condition. It is thus seen that all the steps involved in the assembly of the elastic coupling according to the present invention may be performed simultaneously in a quick, easy manner that is particularly well adapted to mass production techniques.

Another embodiment of the present invention is shown in FIGURES 6 and 7, wherein identical numerals have been used to identify elements that are identical to those having the same numerals in FIGURES 1-5. In this construction, the outer member may comprise the rigid ring 19a and a single integral annular sheet metal stamping 21a, which is cylindrical and concentric with the other elements. Otherwise, the elastic joint is substantially identical to the joint illustrated in FIGURE 1. Assembly of the joint is substantially identical with the assembly as mentioned above in regard to FIGURES 1-5. The outer housing sheet metal stamping 21a may be rigidly stamped to the rigid ring 19a, which is shown in dotted lines by radially outward deformations 24b during assembly; three peripherally spaced outer deformations 24b of the sheet metal stamping 21a are shown in FIGURE 7. Between the edge portion deformations 24b, there are provided three edge portion deformations 24a that extend inwardly to axially engage the side members 25a. Before assembly, the sheet metal stamping 21a is cylindrical; the deformations 24b and 24a are made in a single step at the time of assembly. The deformations 24b of FIGURE 6 perform the same function as the transition portions 29 of FIGURE 1 and the deformations 24a of FIGURE 6 perform the same function as the deformations 24c of FIGURE 1.

The embodiment of the elastic joint shown in FIGURES 6 and 7 is particularly desirable because the stamping 21a, the intermediate elastic member and the inner member may be constructed and preassembled for shipping, storage and sale prior to final assembly with a structural member 19 and another structural member to be inserted in the bore of the inner member.

The inner member and the stamping 21, 21a of the outer member may be sufficiently radially elastic, according to a narrow aspect of the present invention, so that they may be expanded radially into engagement with the concentric relatively rigid members to be coupled for providing only frictional forces between the stamping 21, 21a and the element 19, and between the inner member 11 and the other element (not shown) to be coupled.

The assembly of both the joint embodiment shown in FIGURES 1-5 and FIGURES 6 and 7, according to the preferred embodiments of the present invention can be accomplished simply and quickly by axially pressing together the side members and radially deforming the sheet metal edges of the outer member; this entire operation will produce at most only a negligible stress on the elements to be coupled together (only the element 19 is shown). Furthermore, by using the elastic coupling as shown in FIGURES 6 and 7, it is possible to rigidly clamp the intermediate elastic member with its attached inner member onto a single piece outer housing portion 21a, and simultaneously rigidly clamp the outer housing portion 21a to one of the elements to be coupled 19a. Both of the illustrated embodiments have the distinct advantage that they may be constructed entirely of an easily moldable elastic member and easily constructed sheet metal stampings, which are simple and inexpensive.

The foregoing description of the preferred embodiments is only for purposes of illustration, and it is contemplated that additional embodiments, variations and modifications may occur without departing from the spirit and scope of the present invention.

We claim:

1. An elastic coupling, comprising: a relatively rigid inner member having an outer bearing surface; an outer member having an internal aperture; annular elastic means of highly elastic material having an outer bearing surface for inserting between said inner and outer members essentially without force and elastic deformation in its unstressed condition during assembly; mounting means for deforming said elastic means outer bearing surface radially outwardly tightly against the wall of said outer member aperture and radially inwardly tightly against said inner member bearing surface, including axially pressed together side members on the opposite axial ends of said elastic means; and said mounting means including deformation means on at least one of said inner, outer and side members for rigidly mounting said side members axially spaced from each other a distance less than the unstressed axial dimension of the intermediate portion of said elastic means, wherein said inner member outer bearing surface is spherical; said elastic means outer bearing surface is substantially cylindrical; said side members, consisting of sheet metal stampings having spherical portions conforming to the adjacent spherical shape of said inner member; said deformation means is in said outer member and extends radially inwardly and said elastic means consists essentially of a resilient tube of substantially uniform radial thickness between each of said outer and side members and said inner member.

2. The device of claim 1, wherein said outer member includes a sheet metal stamping having radially outwardly extending deformation means for axially engaging a rigid ring shaped element on opposite sides for preventing relative axial movement.

3. The device of claim 2, wherein said outer member is essentially cylindrical.

4. The device of claim 3, wherein said outer member sheet metal stamping comprises a plurality of separate arcuate sections peripherally engaging each other in a ring.

5. The device of claim 4, wherein at least one of said arcuate sections is provided with preformed cross-sectional deformations for the axial engagement of the ring-shaped element when moved radially in their positions.

6. The device of claim 5, wherein said preformed deformations are substantially U-shaped.

7. The device of claim 1, wherein said outer member is essentially cylindrical.

8. An elastic coupling comprising: a relatively rigid inner member having an outer bearing surface; an outer member having an internal aperture; annular elastic means of highly elastic material having an outer bearing surface for inserting between said inner and outer members essenntially without force and elastic deformation in its unstressed condition during assembly; mounting means for deforming said elastic means outer bearing surface radially outwardly tightly against the wall of said outer member aperture and radially inwardly tightly against said inner member bearing surface, including axially pressed together side members on the opposite axial ends of said elastic means; and said mounting means including deformation means on at least one of said inner, outer and side members for rigidly mounting said side members axially spaced from each other a distance less than the unstressed axial dimension of the intermediate portion of said elastic means, wherein said outer member includes a sheet metal stamping having radially outwardly extending deformation means for axially engaging a rigid ring shaped element on opposite sides for preventing relative axial movement, said outer member being essentially cylindrical, and wherein said outer member sheet metal stamping comprises a plurality of separate arcuate sections peripherally engaging each other in a ring.

9. An elastic coupling, comprising: a relatively rigid inner member having an outer bearing surface; an outer member having an internal aperture; annular elastic means of highly elastic material having an outer bearing surface for inserting between said inner and outer members essentially without force and elastic deformation on its unstressed condition during assembly; mounting means for deforming said elastic means outer bearing surface radially outwardly tightly against the wall of said outer member aperture and radially inwardly tightly against said inner member bearing surface, including axially pressed together side members on the opposite axial ends of said elastic means; and said mounting means including deformation means on at least one of said inner, outer and side members for rigidly mounting said side members axially spaced from each other a distance less than the unstressed axial dimension of the intermediate portion of said elastic means, wherein said outer member includes a sheet metal stamping having radially outwardly extending deformation means for axially engaging a rigid ring shaped element on opposite sides for preventing relative axial movement, and wherein said outer member sheet metal stamping comprises a plurality of separate arcaute sections peripherally engaging each other in a ring.

References Cited

UNITED STATES PATENTS

| 1,793,874 | 2/1931 | Skillman. | |
| 2,905,492 | 9/1959 | Alexander | 287—87 |
| 3,030,132 | 4/1962 | Compton | 287—87 X |
| 3,117,810 | 1/1964 | Hutton | 287—87 |

FOREIGN PATENTS

| 481,337 | 3/1938 | Great Britain. |
| 543,013 | 2/1942 | Great Britain. |

REINALDO P. MACHAD, Primary Examiner

ANDREW V. KUNDRAT, Assistant Examiner